United States Patent [19]

Theyse

[11] 4,112,311
[45] Sep. 5, 1978

[54] WINDMILL PLANT FOR GENERATING ENERGY

[75] Inventor: Frederik H. Theyse, Bensberg-Herkenrath, Fed. Rep. of Germany

[73] Assignee: Stichting Energieonderzoek Centrum Nederland, The Hague, Netherlands

[21] Appl. No.: 749,267

[22] Filed: Dec. 10, 1976

[30] Foreign Application Priority Data

Dec. 18, 1975 [NL] Netherlands .......................... 7514750

[51] Int. Cl.² .......................... H02P 9/04; F03D 9/00
[52] U.S. Cl. ...................................... 290/44; 290/55; 322/35
[58] Field of Search .................... 290/43, 44, 54, 55; 74/752 D, 752 A; 322/35

[56] References Cited

U.S. PATENT DOCUMENTS

| | | | |
|---|---|---|---|
| 2,363,850 | 11/1944 | Bany | 290/44 |
| 2,539,862 | 1/1951 | Rushing | 290/44 |
| 2,597,357 | 5/1952 | McCormick | 74/752 D |
| 2,653,250 | 9/1953 | Romani | 290/44 |
| 2,717,524 | 9/1955 | Davis | 74/752 D |
| 3,974,395 | 8/1976 | Bright | 290/44 |

OTHER PUBLICATIONS

Lindsley, "Wind Power," Popular Science, 7/74, pp. 54–59.
Black, "Something in the Wind," Machine Design, 5/20/76, pp. 18–26.
Jayadev, "Windmills Stage A Comeback," IEEE Spectrum, 11/76, pp. 45–49.

*Primary Examiner*—Robert K. Schaefer
*Assistant Examiner*—Eugene S. Indyk
*Attorney, Agent, or Firm*—Cushman, Darby & Cushman

[57] ABSTRACT

Windmill or solar plant for generating electric energy having a transmission in the form of an epicyclic gear transmission with sun wheel and planet wheels, the sun wheel of which is connected to the generator shaft, and the planet wheels being coupled with a regulator motor having two directions of rotation as well as a variable speed of rotation, the ring gear being driven directly or indirectly by the windmill or driving shaft.

10 Claims, 1 Drawing Figure

U.S. Patent   Sept. 5, 1978   4,112,311
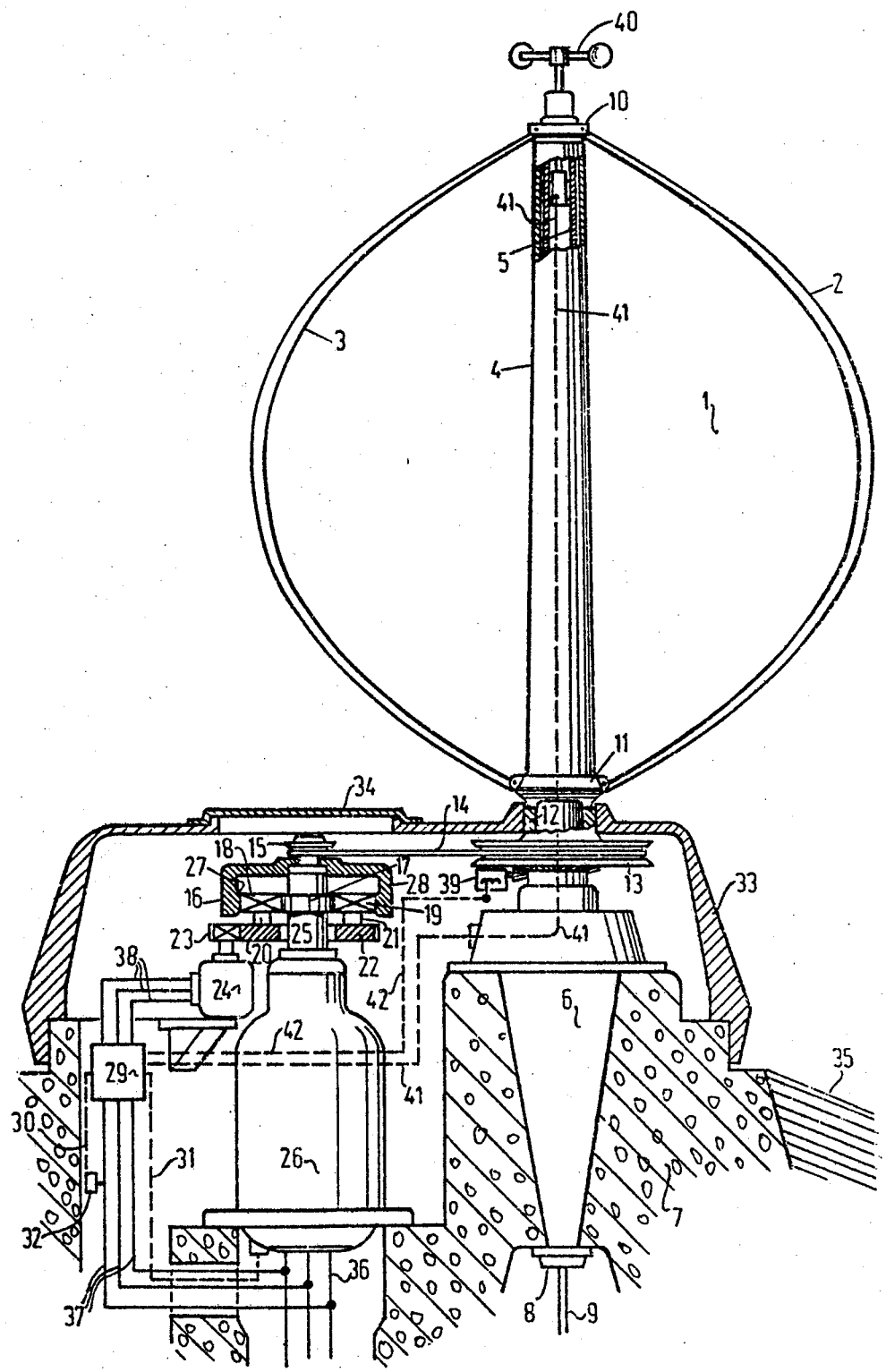

WINDMILL PLANT FOR GENERATING ENERGY

The invention relates to a windmill plant for generating energy, preferably electric energy, equipped with a rotating energy producer coupled to a consumer network.

Such plants are already known. A drawback entailed by them, however, is that the demands of the consumer have been difficult to harmonize with the aerodynamic demands imposed by the windmill itself. The aim of plants of this nature has generally been the generation of electric power. The consumer of electric energy requires a maximum stability of voltage and frequency, whereas the rotational speed of the windmill is a function of the wind velocity, which is highly variable. A windmill, and especially a type of windmill having the best chance of generating larger power, such as the Darrieus type, requires for adequate efficiency a peripheral velocity of the vanes which is in a fairly fixed ratio to the wind velocity. Hence it follows that the number of revolutions per minute of the windmill will have to be higher in prepertion as the wind velocity is higher.

According to the invention, this drawback is met by interposing at least one transmission—at least one of which is designed so that its transmission ratio can be varied—between the windmill and the aforementioned energy producer. The variable transmission then allows the rotational speed of the windmill to be adapted to the wind velocity in the required manner, in such a way that the demands made upon the consumer network do not have to suffer.

The most ideal state is reached if provisions are made for the transmission ratio to be controlled by means of a control element which compares an operational quantity to a desired value and—depending on the difference between this operational quantity and this desired value—modifies the transmission ratio so that the rotational speed of the windmill rotor continues to be adapted to the momentary wind velocity. The plant can be built up from electric, pneumatic or hydraulic components, or from a combination thereof. In the case of an electric system, the control may be performed, for example, in such a way that an operational quantity constituted by, or related to, the frequency of the consumer network is compared to the desired value, whereupon the transmission ratio—depending on the difference between this operational quantity and the desired value—is modified so that the rotational speed of the generator remains substantially constant. The operational quantity can also be related to the electric network voltage. The speed of the generator may be taken for the operational quantity to be held constant. If a number of windmill plants rotate with generators electrically connected in parallel, it is highly practical to choose the network frequency as the comparison quantity which is to be kept constant. It is then possible, in combination with the data of wind velocity and speed of the wind turbine, to create an operational state such that the energy supply to the network is maximized.

According to a preferred embodiment, the variable transmission is implemented in the form of an epicyclic gear transmission comprising a sun wheel and planet wheels, and sun wheel being attached to the generator shaft and the planet wheels being coupled with a variable-speed motor.

The use of such an epicyclic gear for an accelerating transmission is here especially advisable because epicyclic gears are more suitable for this purpose than other transmissions, among other reasons because of their very high efficiency.

It will be useful to connect the variable-speed motor electrically to the output terminals of the electric generator, or to feed this motor from the internal utility network.

According to a variant, it would be possible to install a pressure fluid pump or a compressor so that it is driven from the generator shaft. Pressurized medium from this pump or this compressor could be supplied to a hydraulic or pneumatic variable-speed motor. Such a motor can be a turbine. In this case, decreases of wind velocity causing the windmill to rotate more slowly will primarily tend to reduce the speed of rotation of the electric generator, and thereby the network frequency. At that moment, the control becomes operative and stabilizes the network frequency and the speed of the generator by returning energy to the generator via the slightly adjusted epicyclic gear, with the aid of the variable-speed motor and of the epicyclic gear. This ensures power being supplied to the network, and not extracted from it, by the wind generator.

An example of embodiment of the invention will be explained in further detail with the aid of the appended FIGURE.

In this FIGURE, reference 1 indicates a Darrieus windmill, also referred to as a wind turbine, which is provided with vanes 2 and 3. The vanes, curved in the form of a catenary, are connected at the top and bottom to a sleeve 4 which rotates about a column 5 placed inside it. This column is anchored with an anchorage 6 in a concrete foundation 7. The foot of this anchorage is fixed in the foundation by means of clamping elements 8 which, at their bottom, allow the passage of conduits 9 for purposes of measuring and possibly for lubrication. The vanes or blades 2 and 3 are attached at their upper end to a ring 10 and at their lower end to a ring 11. Both rings are supported by the column 5 which extends through them. The rotary motion of the rotor is transmitted through the sleeve 12 to a wheel 13 which drives a pinion 15 by means of a rope transmission. The drawing shows only one rope, but several ropes can naturally be arranged in parallel if this is required by the power to be transmitted. Of course, chain-wheel or gear transmissions and the like are also possible. In this first transmission, the average turbine speed is accelerated to the average generator speed. Reference 16 indicates an epicyclic gear transmission provided with a sun wheel 17 and planet wheels 18 and 19. The shaft journals 20 and 21, on which these planet wheels can rotate, are mounted on a ring 22, provided on the outside with a toothed ring engaging a geared pinion 23, which is driven by the variable-speed motor/generator 24. The planet wheels 18 and 19 engage on the inside with the sun wheel 17, which is rigidly attached to the shaft 25 of the electric generator 26, and are meshed on the outside with the toothed ring 27 which forms the ring gear fitted on the inside of the rotor disc 28, which can rotate loosely about the shaft 25 but is rigidly attached to the pinion 15. A control member 29 is connected to measuring lines 30, 31, 41 and 42. The speed of the generator 26 is observed via line 31. Line 30 allows information on the frequency of the electric network, as supplied by the frequency meter 32, to be transmitted to the control member 29. Line 41 conveys the wind-velocity signal from the anemometer 40 to the control member 29, while line 42 transmits the signal from the meter 39 which measures the speed of the wind turbine. The complete assembly is housed in a waterproof casing 33, which is provided at the top with a lid 34 to make the plant accessible for purposes of inspection and maintenance. Reference 35 indicates the surface layer of an embankment in which the windmill plant is embedded. The plant illustrated shows a generator of the usual three-phase type. Electric energy is extracted by means of cables 36, branches 37 of which are connected to the variable-speed motor 24 via the control member 29.

In case of subsiding wind, resulting in the possibility of the generator running at too low a speed, the control system responds at once to control pulses from the line 30 which carries the comparison signal, and from the pulse lines 41 and 42. A suitable amount of electric energy is passed from the connecting lines 37 to the lines 38, causing the variable-speed motor 34 to become operational in the required direction of rotation and at the proper speed, so that, despite the decelerated motion of disc 28, the sun wheel 17 and therefore the shaft 25 of the generator 26 continue rotating at the original speed. If the wind turbine is accelerated, the variable-speed motor/generator 24 brakes the planet wheel support 22 in such a way that the desired rotational speed of the generator is maintained while the generation of energy simultaneously increases. The whole control system can thus keep the power supplied at a maximum value in each operational state.

In the above, an embodiment has been described in which the windmill 1 drives the toothed ring 27, and the variable-speed motor 24 the planet wheels 18 and 19. Without departing from the principle of the invention, the embodiment can also be selected so that the windmill drives the planet wheels, and the variable-speed motor the toothed ring. In the following claims, therefore, claims 4 and 11 should also be understood so that the drive of the planet wheels and that of the ring gear are interchangeable.

I claim:

1. A Wind-driven power generating system comprising: a wind-driven impeller having blades; a variable ratio transmission having a main rotary output, a main rotary input and a rotary connection capable of operating either as an input or an output, the rotation of the main output being a function of the rotations of the main input and the rotary connection; means drivingly connecting the impeller to the main transmission input; a main energy convertor drivingly connected to the main transmission output for converting rotation of the latter to another form of energy; means for selectively increasing the decreasing the rotational speed of said main transmission output, said means including a reversible variable speed auxiliary energy-convertor operatively connected to said main convertor and to the rotary connection of the transmission, said auxiliary convertor being operable in a first mode to withdraw energy from the power flow through said main convertor and converting the withdrawn energy to rotation of said rotary connection in an input direction and in a second mode to withdraw energy from said rotary connection when rotating in an output direction and add the withdrawn energy to the power flow through said main convertor; and control means responsive to at least one variable of the system for controlling said auxiliary convertor to operate in a selective one of said modes.

2. A wind-driven power generating system as in claim 1 wherein said transmission is an epicyclic gear transmission having a sun gear drivingly connected to said main rotary output, planet gears drivingly connected to said rotary connection and a ring gear drivingly connected to said main rotary input.

3. A wind-driven power generating system as in claim 2 wherein said main convertor is an alternating current generator coupled to a consumer network and wherein said control means is responsive to at least one of the variables selected from the group consisting of the frequency of the consumer network, the voltage of the consumer network and the speed of rotation of said main convertor.

4. A wind-driven power generating system as in claim 3 wherein the said control means is responsive to an anemometer measuring the wind velocity and also to the speed of the wind operated impeller measured with a tachometer in such a way that the ratio between these variables is compared with a set point value, the outcome of this comparison giving a signal that controls the speed of the said auxiliary energy convertor.

5. A wind-driven power generating system as in claim 1 wherein said transmission is an epicyclic gear transmission having a sun gear drivingly connected to said main rotary output, planet gears drivingly connected to said main rotary input and a ring gear drivingly connected to said rotary connection.

6. A wind-driven power generating system as in claim 1 wherein the said main energy convertor drives a pump for pressurizing a working fluid and supplying it to said auxiliary convertor which is operated with said working fluid, and wherein said control means is responsive in part to the pressure of the said working fluid.

7. A wind-driven power generating system as in claim 1 wherein the main energy convertor is a constant speed electric generator coupled to a consumer network, and wherein the auxiliary energy convertor is an electric engine that is electrically connected to the electric output of said electric generator.

8. A wind-driven power generating system as in claim 1 wherein said control means includes sensors for generating signals representing wind velocity and the rotational velocity of said main energy convertor and impeller velocity and means responsive to said signals to operate said auxiliary energy convertor in a manner to maintain a preselected rotational speed of said main energy convertor.

9. A wind-driven power generating system comprising: a wind-driven impeller having blades; a variable ratio transmission having a main rotary output, a main rotary input and a rotary connection capable of operating either in an input direction or in an output direction, the rotation of the main output being a function of the rotations of the main input and the rotary connection means drivingly connecting the impeller to the main transmission input; a main energy convertor drivingly connected to the main transmission output for converting rotation of the latter to another form of energy; means for selectively increasing and decreasing the rotational speed of said main transmission output, said means including a reversible variable speed auxiliary energy-convertor operatively connected to said main convertor and to the rotary connection of the transmission, said auxiliary convertor being operable in a first mode to withdraw energy from the power flow through said main convertor and converting the withdrawn energy to rotation of said rotary connection in an input direction and in a second mode to withdraw energy from said rotary connection when rotating in an output direction and add the withdrawn energy to the power flow through said main convertor; and control means comparing a number of operational variables of the system with a setpoint value thereof and responsive to the difference between these variables and the setpoint values to modify the transmission ratio of said transmission so that the rotational speed of the impeller stays adapted to the momentary wind velocity.

10. Apparatus as in claim 9 wherein said control means maintains the speed of said main energy convertor essentially constant.

* * * * *